(12) United States Patent
Haneda et al.

(10) Patent No.: US 8,746,761 B2
(45) Date of Patent: Jun. 10, 2014

(54) VEHICLE BUMPER DEVICE

(75) Inventors: Shinichi Haneda, Anjo (JP); Kiyoichi Kita, Okazaki (JP); Jun Shobo, Anjo (JP); Tamaki Obayashi, Toyama (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 13/503,872

(22) PCT Filed: Nov. 2, 2010

(86) PCT No.: PCT/JP2010/069517
§ 371 (c)(1),
(2), (4) Date: Apr. 25, 2012

(87) PCT Pub. No.: WO2011/055725
PCT Pub. Date: May 12, 2011

(65) Prior Publication Data
US 2012/0228889 A1 Sep. 13, 2012

(30) Foreign Application Priority Data

Nov. 5, 2009 (JP) ................................. 2009-254070

(51) Int. Cl.
*B60R 19/04* (2006.01)
(52) U.S. Cl.
USPC .......................................... 293/102; 293/122
(58) Field of Classification Search
CPC ...... B60R 19/18; B60R 19/023; B60R 19/04; B60R 2019/1826; B60R 2019/1813; B60R 2019/1806
USPC ............. 296/187.01, 187.03, 187.09, 203.02; 293/102, 120, 122, 132, 133, 138, 139
See application file for complete search history.

(56) References Cited

U.S. PATENT DOCUMENTS 5,306,058 A 4/1994 Sturrus et al.
6,179,355 B1 * 1/2001 Chou et al. .................... 293/132
(Continued)

FOREIGN PATENT DOCUMENTS

JP 2846983 10/1998
JP 2000-335333 12/2000
(Continued)

OTHER PUBLICATIONS

International Preliminary Report on Patentability for PCT/JP2010/069517 dated Jun. 12, 2012.

(Continued)

*Primary Examiner* — Jason S Morrow
*Assistant Examiner* — E Turner Hicks
(74) *Attorney, Agent, or Firm* — Finnegan, Henderson, Farabow, Garrett & Dunner, LLP

(57) ABSTRACT

A bumper reinforcement includes a front wall portion, an upper wall portion, and a lower wall portion. The front wall portion constitutes the front portion of the bumper reinforcement. The upper wall portion constitutes the upper half of the rear portion of the bumper reinforcement. The lower wall portion, connected to the lower edge of the front wall portion, constitutes the lower half of the rear portion. Outer grooves, formed by denting the front wall portion rearward, extend along the vehicle width direction. Upper grooves, formed by denting downward a top wall of the upper wall portion, are located intermittently along the width direction and extend in the longitudinal direction. The lower wall portion comprises a bottom wall constituting the bottom of the lower wall portion. Lower grooves, formed by denting the lower wall portion upward, are located intermittently along the width direction and extend in the longitudinal direction.

5 Claims, 3 Drawing Sheets

(56) References Cited

U.S. PATENT DOCUMENTS

| | | | | |
|---|---|---|---|---|
| 6,352,297 | B1* | 3/2002 | Sundgren et al. | 293/102 |
| 6,398,275 | B1* | 6/2002 | Hartel et al. | 293/102 |
| 6,726,261 | B2* | 4/2004 | Goto et al. | 293/120 |
| 6,893,062 | B2* | 5/2005 | Amano et al. | 293/102 |
| 7,210,717 | B1* | 5/2007 | Baccouche et al. | 293/102 |
| 7,503,601 | B2* | 3/2009 | Agrahari | 293/102 |
| 2002/0053805 | A1 | 5/2002 | Azuchi et al. | |
| 2005/0225101 | A1 | 10/2005 | Bladow et al. | |
| 2006/0028032 | A1* | 2/2006 | Henseleit | 293/102 |
| 2008/0093867 | A1 | 4/2008 | Glasgow et al. | |
| 2010/0127519 | A1* | 5/2010 | Wakabayashi et al. | 293/120 |

FOREIGN PATENT DOCUMENTS

| | | |
|---|---|---|
| JP | 2001-260774 | 9/2001 |
| JP | 2004-114864 | 4/2004 |
| JP | 2005-263114 | 9/2005 |
| JP | 2006-273081 | 10/2006 |
| JP | 2008-056081 | 3/2008 |
| WO | WO 01/44017 | 6/2001 |
| WO | WO 2005/110638 | 11/2005 |
| WO | WO 2008/051968 A2 | 5/2008 |

OTHER PUBLICATIONS

International Search Report in International Application No. PCT/JP2010/069517; Mailing Date: Jan. 11, 2011.

Extended European Search Report for European Appl. No. 10828285.6 dated Apr. 11, 2013.

* cited by examiner

VEHICLE BUMPER DEVICE

CROSS-REFERENCE TO RELATED APPLICATIONS

This application is a national phase application of International Application No. PCT/JP2010/069517, filed Nov. 2, 2010, and claims the priority of Japanese Application No. 2009-254070, filed Nov. 5, 2009, the contents of both of which are incorporated herein by reference.

FIELD OF THE INVENTION

The present invention relates to a vehicle bumper device.

BACKGROUND OF THE INVENTION

A vehicle bumper device includes a bumper reinforcement, which extends in the direction of the width of a vehicle. Each end portion of the bumper reinforcement is coupled to one of a pair of coupling members (for example, side members), which extends in the front-rear direction of the vehicle.

The bumper reinforcement disclosed in Patent Document 1 is formed by a high-tensile steel plate, which is obtained through roll forming. The bumper reinforcement has a constant cross-sectional shape along the longitudinal dimension thereof. The bumper reinforcement is curved along an arc having a predetermined radius of curvature. The bumper reinforcement disclosed in Patent Document 2 is formed by a high-tensile steel plate, which is made through press forming. The bumper reinforcement has a substantially B-shaped cross-section. The cross-sectional shape of the bumper reinforcement gradually changes from the center of the bumper reinforcement toward either end portion.

PRIOR ART DOCUMENT

Patent Document

Patent Document 1: Japanese Patent No. 2846983 (description of U.S. Pat. No. 5,306,058)
Patent Document 2: Japanese Laid-Open Patent Publication No. 2000-335333

SUMMARY OF THE INVENTION

FIG. 4(a) shows a bumper reinforcement 90 according to Patent Documents 1 and 2. When the bumper reinforcement 90 collides with a pole P, and load is applied in a concentrated manner to a center of the bumper reinforcement 90 in the longitudinal direction, which has the smallest strength, as shown in FIG. 4(a), the bumper reinforcement 90 is easily broken. FIG. 4(b) shows an offset collision, in which an obstacle V collides with an end portion of the bumper reinforcement 90 that is located in front of one of coupling members 91. The load of the obstacle V is evenly applied to the end portion. In this case, the cross-section of a part of the bumper reinforcement 90 between the obstacle V and the coupling member buckles. As a result, the bumper reinforcement 90 cannot efficiently absorb the energy of impact.

For those reasons above, the bending strength of the center of the bumper reinforcement 90 and the cross-sectional buckling strength at the end portions of the bumper reinforcement 90 need to be increased. In this regard, the plate thickness may be increased over the entire bumper reinforcement 90. However, as the thickness increases, the mass of the bumper reinforcement 90 will increase.

Accordingly, it is an objective of the present invention to provide a vehicle bumper device that is capable of increasing the bending strength of the center of the bumper reinforcement and the cross-sectional buckling strength of the end portions of the bumper reinforcement, without increasing the mass of the bumper reinforcement.

To achieve the foregoing objective and in accordance with one aspect of the present invention, a vehicle bumper device including a bumper reinforcement is provided. The bumper reinforcement extends in a width direction of a vehicle and has a pair of end portions, each of which is coupled to one of a pair of coupling members extending in a front-rear direction of the vehicle. The bumper reinforcement further includes an outer wall portion, an upper wall portion, a lower wall portion, an outer groove, a top wall, upper grooves, a bottom wall, and a lower groove. The outer wall portion extends in the vehicle width direction and forms a front portion of the bumper reinforcement. The upper wall portion is connected to an upper edge of the outer wall portion. The upper wall portion, together with the outer wall portion, forms a hollow portion that opens in the vehicle width direction, the upper wall portion forms an upper half of a rear portion of the bumper reinforcement. The lower wall portion is connected to a lower edge of the outer wall portion. The lower wall portion, together with the outer wall portion, forms a hollow portion that opens in the vehicle width direction, the lower wall portion forms a lower half of the rear portion of the bumper reinforcement. The outer groove is formed by denting the outer wall portion rearward. The outer groove extends in the vehicle width direction. The top wall forms a top of the upper wall portion. Upper grooves are formed in the top wall and arranged at intervals along the vehicle width direction. The upper grooves are formed by denting the top wall downward and extending in the vehicle front-rear direction. The bottom wall forms a bottom of the lower wall portion. Lower grooves are formed in the bottom wall and at intervals arranged along the vehicle width direction. The lower grooves are formed by denting the bottom wall upward and extending in the vehicle front-rear direction.

In the above described vehicle bumper device, the outer groove is arranged in a center of the bumper reinforcement with respect to the vehicle width direction, and the upper grooves and the lower grooves are arranged in the end portions of the bumper reinforcement.

According to each of the above configurations, when load is applied in a concentrated manner to a center of the bumper reinforcement, which has the smallest strength, due to a collision with a pole, the bumper reinforcement is not easily broken because the rigidity of the outer wall portion is increased by the outer groove. Also, when load is evenly applied to an end portion of the bumper reinforcement due to an offset collision, the cross section of the end portion of the bumper reinforcement does not easily buckle because the rigidity of the upper and lower walls is increased is increased by the upper and lower grooves. Therefore, without increasing the thickness over the entire bumper reinforcement, the strength of each part is increased to a level sufficient for withstanding the corresponding type of collision.

In the above described vehicle bumper device, the upper wall portion and the lower wall portion each have an opposing wall. The opposing walls face each other in a vertical direction. Each opposing wall has a step such that a front portion and a rear portion of the opposing wall are at different heights.

According to this configuration, the steps formed on the opposing walls shorten the buckle wavelength of the opposing walls, and the buckling strength of the bumper reinforcement is increased, accordingly.

In the above described vehicle bumper device, a straight portion is formed in a center of the bumper reinforcement with respect to the vehicle width direction. The end portions of the bumper reinforcement are inclined rearward from the ends of the straight portion.

According this configuration, the bumper reinforcement has two bends. Thus, at a collision with a vehicle having a flat front end or a flat rear end, the load applied to the straight portion of the bumper reinforcement from the front is evenly dispersed in the straight portion. This prevents the load from being concentrated on a single part of the bumper reinforcement and from breaking the part.

In the above described vehicle bumper device, the radius of curvature of each corner in the cross-sectional shape of the bumper reinforcement is less than or equal to 5 mm.

According to this configuration, compared to a case in which the radius of curvature is greater than 5 mm, the bending strength and the cross-sectional buckling strength of the bumper reinforcement are both increased.

DETAILED DESCRIPTION OF THE PREFERRED EMBODIMENTS

A vehicle bumper device according to one embodiment of the present invention will now be described. In this embodiment, the vehicle bumper device is applied to a vehicle front portion.

Figure 1:
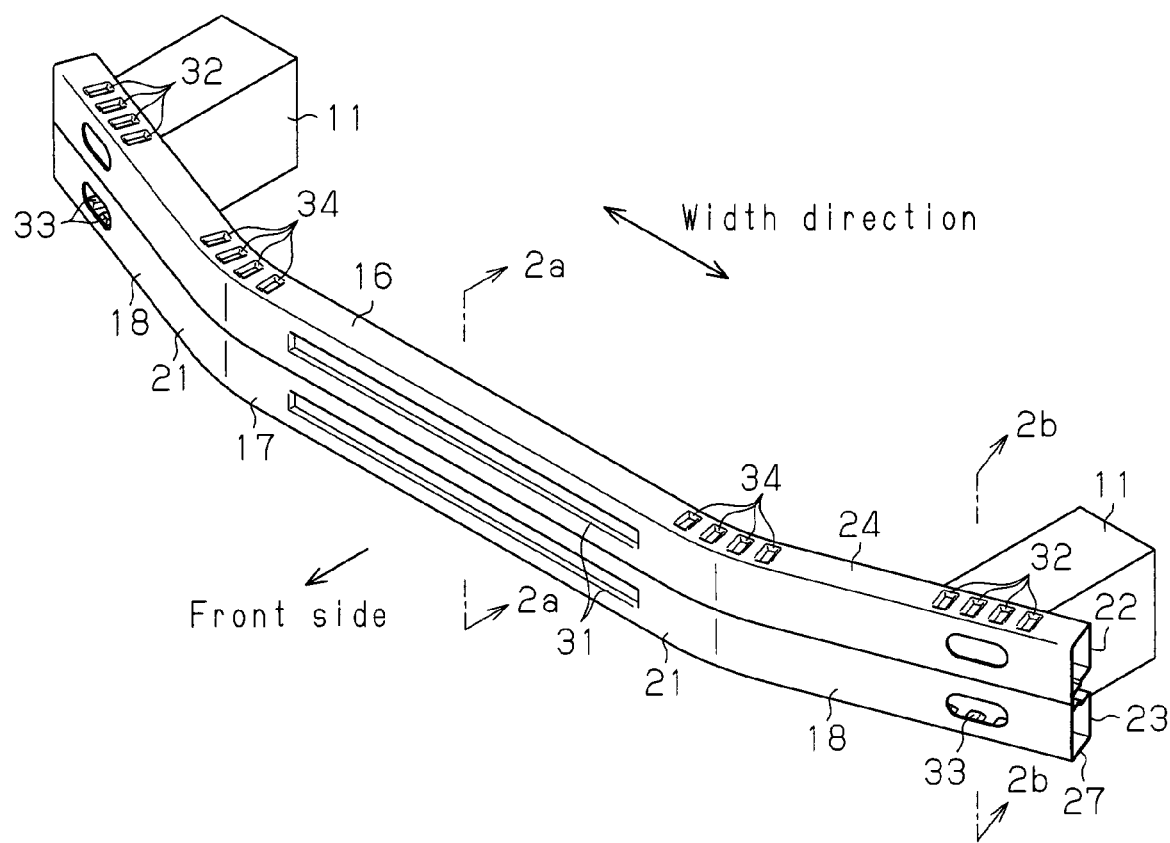
FIG. 1 is a perspective view illustrating a vehicle bumper device according to one embodiment of the present invention.

As shown in FIG. 1, a vehicle has a pair of side members 11, which serve as coupling members. Each side member 11 is located on one side of the vehicle. The side members 11 are formed by metal plates. The side members 11 have a hollow structure with a substantially rectangular cross-section. The side members 11 extend in the front-rear direction of the vehicle. The side members 11 form a part of the vehicle body. The front end of each side member 11 is connected to one end of a bumper reinforcement 16 via a bracket (not shown). The bumper reinforcement 16 extends in the width direction of the vehicle. The bumper reinforcement 16 is formed by a metal plate obtained through roll forming, for example, a steel plate of approximately 1500 MPa. The bumper reinforcement 16 has a substantially constant cross-sectional shape along the longitudinal dimension thereof. The bumper reinforcement 16 includes a straight portion 17, which extends in the vehicle width direction, and a pair of end portions 18, each of which extends from one end of the straight portion 17 and is inclined rearward. The bumper reinforcement 16 is coupled to and supported by the front end faces of the side members 11 at the end portions 18. The bumper reinforcement 16 is inclined at boundaries between the straight portion 17 and the end portions 18. That is, the bumper reinforcement 16 is inclined at two parts between the side members 11 with respect to the vehicle width direction. The boundaries between the straight portion 17 and the end portions 18 are symmetrically arranged with respect to the centerline of the vehicle.

Figure 2A:
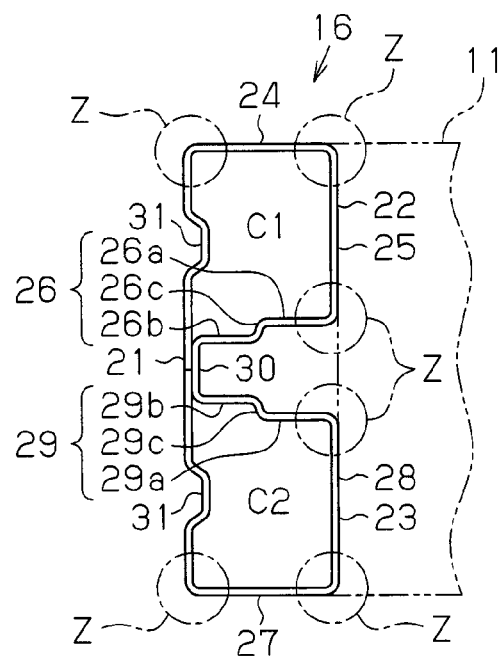
FIGS. 2(a) and 2(b) are cross-sectional views taken along line 2a-2a and 2b-2b in FIG. 1, respectively.
Figure 2B:
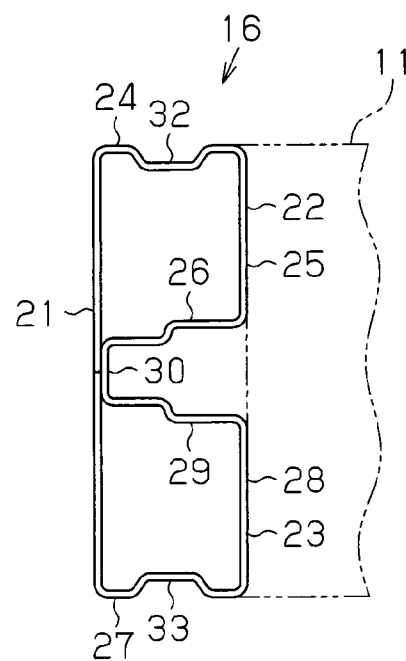

As shown in FIGS. 2(a) and 2(b), the height of the bumper reinforcement 16 is equivalent to the height of the side members 11. Accordingly, the bumper reinforcement 16 is substantially entirely supported by the side members 11 in the vertical direction. The bumper reinforcement 16 has a B-shaped cross section. The bumper reinforcement 16 includes an outer wall portion, which is a front wall portion 21, an upper wall portion 22, and a lower wall portion 23. The front wall portion 21 extends in the vehicle width direction and forms a front part of the bumper reinforcement 16. The upper wall portion 22 is connected to the upper edge of the front wall portion 21 and forms a hollow portion C1 together with the front wall portion 21. The hollow portion C1 opens in the vehicle width direction (the direction perpendicular to the sheet of FIGS. 2(a) and 2(b)). The upper wall portion 22 forms the upper half of the rear portion of the bumper reinforcement 16. The lower wall portion 23 is connected to the lower edge of the front wall portion 21 and, together with the front wall portion 21, forms a hollow portion C2, which opens in the vehicle width direction. The lower wall portion 23 forms the lower half of the rear portion of he bumper reinforcement 16.

The upper wall portion 22 has a U-shaped cross section and opens forward. The upper wall portion 22 has a top wall 24, a rear wall 25, and an extended wall 26. The top wall 24 is connected to the upper edge of the front wall portion 21, and forms the top of the upper wall portion 22. The rear wall 25 extends downward from the rear edge of the top wall 24. The extended wall 26 extends forward from the lower edge of the rear wall 25 and contacts the rear end face of front wall portion 21. Likewise, the lower wall portion 23 has a U-shaped cross section and opens forward. The lower wall portion 23 has a bottom wall 27, a rear wall portion 28, and an extended wall 29. The bottom wall 27 is connected to the lower edge of the front wall portion 21, and forms the bottom of the lower wall portion 23. The rear wall portion 28 extends upward from the rear edge of the bottom wall 27. The extended wall 29 extends forward from the upper edge of the rear wall portion 28 and contacts the rear end face of front wall portion 21. The rear wall portions 25, 28 of the bumper reinforcement 16 are parts that are coupled to the side members 11.

The front wall portion 21 includes a surface that receives load from the front at a collision with a vehicle. At the center of the front wall portion 21, edges of metal plates are caused to abut against each other through roll forming. At the front wall portion 21, the edges of metal plates are welded to a connector wall 30. The extended walls 26, 29 are opposing walls, which face each other in the vertical direction and are formed continuously via the connector wall 30. The connector wall 30 extends in the vehicle width direction while being laid on a center of the front wall portion 21. The extended wall 26 has a step 26c. The step 26c makes a wall section 26b, which is closer to the connector wall 30, lower than a wall section 26a, which is closer to the rear wall 25. Likewise, the extended wall 29 has a step 29c. The step 29c makes a wall section 29b, which is closer to the connector wall 30, higher than a wall section 29a, which is closer to the rear wall portion 28. Further, in the cross-sectional shape of the bumper reinforcement 16, the corners in sections Z shown in FIG. 2(a) are formed to have a radius of curvature from 2 to 5 mm. For example, the corners have a radius of curvature of 2 mm. The corners in sections Z act dominantly during plastic deformation of the bumper reinforcement 16 at a collision with another vehicle. By setting the radius of curvature at each corner in sections Z to 2 to 5 mm, the second moment of area and coefficient of cross-sectional collapse at fixed ends of the bumper reinforcement 16, that is, the bending strength and the cross-sectional buckling strength are increased.

As shown in FIGS. 1, 2(a) and 2(b), a pair of outer grooves 31 is formed in the front wall portion 21. The outer grooves 31 are formed by denting the front wall portion 21 rearward. The outer grooves 31 are located on both sides of the center of the front wall portion 21. The outer grooves 31 extend in the vehicle width direction in the straight portion 17. The outer grooves 31 increase the rigidity of the front wall portion 21 against load applied from the front.

Sets of four upper grooves 32 are formed in the top wall 24. The upper grooves 32 are formed by downwardly denting each of the end portions 18 of the bumper reinforcement 16, which are coupled to the side members 11. The upper grooves 32 are arranged at intervals in the vehicle width direction. The upper grooves 32 extend in the front-rear direction of the vehicle. Likewise, sets of four lower grooves 33 are formed in the bottom wall 27. The lower grooves 33 are formed by upwardly denting each of the end portions 18 of the bumper reinforcement 16, which are coupled to the side members 11. The lower grooves 33 are arranged to face the upper grooves 32 in the vertical direction. Therefore, like the upper grooves 32, the lower grooves 33 are arranged at intervals in the vehicle width direction, and extend in the front-rear direction of the vehicle. The upper grooves 32 and the lower grooves 33 increases the rigidity of the top wall 24 and the bottom wall 27 against load from the front, respectively. The top wall 24 has four grooves 34 at the boundary between the straight portion 17 and each end portion 18. The bottom wall 27 also has four grooves 34 at the boundary between the straight portion 17 and each end portion 18. When the bumper reinforcement 16 is bent at two points, the grooves 34 promote the bending action to prevent undesired stress from being generated.

A method for manufacturing the above described bumper reinforcement 16 will now be described.

Through press forming, which is performed prior to roll forming, a metal workpiece having attachment holes and grooves 31 to 34 is produced. Then, in the roll forming, a bumper reinforcement 16 is manufactured. The manufacturing method reduces the steps performed by a roll forming apparatus compared to a case in which a bumper reinforcement 16 is manufactured only through roll forming. The manufacturing line is shortened, accordingly.

Figure 3:
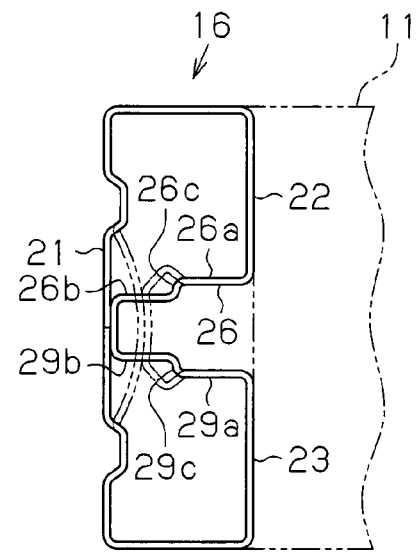
FIG. 3 is a cross-sectional view showing operation of the vehicle bumper device of the embodiment.
Figure 4A:
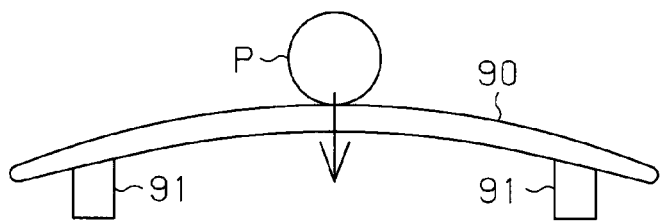
FIGS. 4(a) and 4(b) are explanatory diagrams showing operation of a prior art.
Figure 4B:
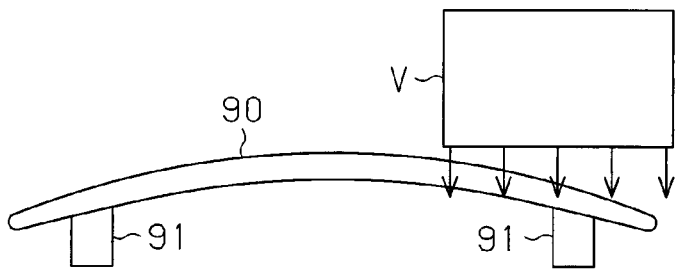

An impact applied from the front due to a collision with a vehicle is transmitted to the side members 11 (vehicle body) via the bumper reinforcement 16. At this time, the bumper reinforcement 16 is plastically deformed to weaken the impact transmitted to the vehicle body, so that the energy of impact applied to the vehicle body and occupants is absorbed. As shown in FIG. 3, the steps 26c, 29c formed in the extended wall 26, 29, respectively, reduces the buckle wavelength of the extended wall 26, 29, and the buckling strength of the bumper reinforcement 16 is increased accordingly.

Further, even if a pole P collides with a center of the bumper reinforcement 16 in the longitudinal direction, the bumper reinforcement 16 is not easily broken. This is because the outer grooves 31 increase the rigidity of the front wall portion 21. Also, when load is evenly applied to an end portion 18 of the bumper reinforcement 16 due to an offset collision, the cross section of the end portion 18 of the bumper reinforcement 16, which is held between an obstacle V and the side member 11, does not easily buckle. This is because the upper grooves 32 and the lower grooves 33 increase the rigidity of the top wall 24 and the bottom wall 27.

The above described vehicle bumper device achieves the following advantages.

(1) Even if a pole P collides with the bumper reinforcement 16 at a center in the longitudinal direction, the outer grooves 31 prevents the bumper reinforcement 16 from being broken. Also, when load is evenly applied to an end portion 18 of the bumper reinforcement 16 due to an offset collision, the upper grooves 32 and the lower grooves 33 prevent the cross section of the end portion 18 of the bumper reinforcement 16 from buckling. Therefore, without increasing the thickness over the entire bumper reinforcement 16, the strength of each part is increased to a level sufficient for withstanding the corresponding type of collision, so that an impact from the front of the vehicle is efficiently absorbed.

(2) The steps 26c, 29c formed in the extended wall 26, 29, respectively, reduces the buckle wavelength of the extended wall 26, 29, and the buckling strength of the bumper reinforcement 16 is increased accordingly.

(3) The bumper reinforcement 16 has two bends. Thus, at a collision with a vehicle having a flat front end or a flat rear end, the load applied to the straight portion 17 of the bumper reinforcement 16 from the front is evenly dispersed in the straight portion 17. This prevents the load from being concentrated, for example, on a single part of the bumper reinforcement 16 and from breaking the part.

(4) The radius of curvature at each corner of the bumper reinforcement 16 is set to 2 to 5 mm. Compared to a case in which the radius of curvature is, for example, greater than 5 mm, the bending strength and the cross-sectional buckling strength of the bumper reinforcement 16 are both increased.

The above embodiment may be modified as follows.

The number of the outer grooves 31 may be one or more than two. The outer grooves 31 may extend along the entire longitudinal dimension of the bumper reinforcement 16.

Each set of the upper grooves 32 and the lower grooves 33 may include three or less grooves or five or more grooves. The upper grooves 32 or the lower grooves 33 may be intermittently formed along the entire longitudinal dimension of the bumper reinforcement 16.

The bumper reinforcement 16 may be formed of pressed iron or extruded aluminum alloy.

The present invention may be applied to the rear part of a vehicle.

The bumper reinforcement 16 may be formed through method other than roll forming. For example, the bumper reinforcement 16 may be formed through extrusion or hydroforming. In this case, the radius of curvature at each corner of the bumper reinforcement 16 can be easily set to 2 mm or less (including 0 mm). Accordingly, the bending strength and the cross-sectional buckling strength of the bumper reinforcement 16 are further increased.

The invention claimed is:

1. A vehicle bumper device comprising a bumper reinforcement, wherein the bumper reinforcement extends in a width direction of a vehicle and has a pair of end portions, each of which is coupled to one of a pair of coupling members extending in a front-rear direction of the vehicle, the bumper reinforcement further including:

an outer wall portion, which extends in the vehicle width direction and forms a front portion of the bumper reinforcement;

an upper wall portion connected to an upper edge of the outer wall portion, wherein the upper wall portion, together with the outer wall portion, forming a hollow portion that opens in the vehicle width direction, the upper wall portion forming an upper half of a rear portion of the bumper reinforcement;

a lower wall portion connected to a lower edge of the outer wall portion, wherein the lower wall portion, together with the outer wall portion, forming a hollow portion that opens in the vehicle width direction, the lower wall portion forming a lower half of the rear portion of the bumper reinforcement;

an outer groove that is formed by denting the outer wall portion rearward, the outer groove extending in the vehicle width direction;

a top wall forming a top of the upper wall portion;

upper grooves that are formed in the top wall and arranged at intervals along the vehicle width direction, the upper grooves being formed by denting the top wall downward and extending in the vehicle front-rear direction;

a bottom wall forming a bottom of the lower wall portion; and lower grooves that are formed in the bottom wall and at intervals arranged along the vehicle width direction, the lower grooves being formed by denting the bottom wall upward and extending in the vehicle front-rear direction;

wherein a straight portion is formed in a center of the bumper reinforcement with respect to the vehicle width direction;

wherein the end portions of the bumper reinforcement are inclined rearward from the ends of the straight portion;

wherein the bumper reinforcement is bended to be inclined at boundaries between the straight portion and the end portions;

wherein the upper grooves are formed at the end portions of the bumper reinforcement;

wherein the upper well portion further has grooves extending in the front-rear direction of the vehicle, the grooves are formed by downwardly denting portions at the boundaries of the bumper reinforcement;

wherein the outer groove extends in the vehicle width direction in the straight portion; and wherein a metal plate in which the outer groove, the upper groove, the lower groove and the groove have been formed in advance is subjected to roll forming and the portions at the boundaries are inclined to form the bumper reinforcement.

2. The vehicle bumper device according to claim 1, wherein
the upper grooves and the lower grooves are arranged in the end portions of the bumper reinforcement.

3. The vehicle bumper device according to claim 1, wherein
the upper wall portion and the lower wall portion each have an opposing wall, the opposing walls facing each other in a vertical direction,
each opposing wall has a step such that a front portion and a rear portion of the opposing wall are at different heights, and
the opposing walls are parallel to the top wall and the bottom wall, and extend in the vehicle front-rear direction.

4. The vehicle bumper device according to claim 1, wherein
the radius of curvature of each corner in the cross-sectional shape of the bumper reinforcement is less than or equal to 5 mm.

5. The vehicle bumper device according to claim 1, wherein
the top wall has a plurality of grooves at boundary between the straight portion and each end portion of the bumper reinforcement,
the grooves are arranged at intervals in the vehicle width direction,
the grooves are formed by downwardly denting the corresponding parts of the reinforcement, and
the grooves extend in the vehicle front-rear direction.

* * * * *